(12) United States Patent
Chan

(10) Patent No.: US 7,895,222 B2
(45) Date of Patent: Feb. 22, 2011

(54) DATA RETRIEVAL APPARATUS

(75) Inventor: Raymond Chan, Hunghom (HK)

(73) Assignee: IDT Electronic Products Limited, Kowloon, Hong Kong SAR (CN)

( * ) Notice: Subject to any disclaimer, the term of this patent is extended or adjusted under 35 U.S.C. 154(b) by 525 days.

(21) Appl. No.: 11/210,803

(22) Filed: Aug. 25, 2005

(65) Prior Publication Data

US 2007/0050319 A1     Mar. 1, 2007

(51) Int. Cl.
*G06F 7/00*     (2006.01)
(52) U.S. Cl. .................................. 707/758; 235/472.01
(58) Field of Classification Search ........................ None
See application file for complete search history.

(56) References Cited

U.S. PATENT DOCUMENTS

| | | | | |
|---|---|---|---|---|
| 5,379,271 A | * | 1/1995 | Moedt ........................... | 368/24 |
| 5,580,253 A | * | 12/1996 | Abdalla ....................... | 434/132 |
| 5,877,458 A | | 3/1999 | Flowers | |
| 5,959,281 A | * | 9/1999 | Domiteaux .................. | 434/311 |
| 6,540,141 B1 | * | 4/2003 | Dougherty et al. ..... | 235/462.01 |
| 2002/0020750 A1 | * | 2/2002 | Dymetman et al. .... | 235/472.01 |
| 2004/0049617 A1 | * | 3/2004 | Wang et al. ................. | 710/100 |
| 2005/0046551 A1 | * | 3/2005 | Cranfill et al. ........... | 340/407.1 |
| 2005/0106547 A1 | | 5/2005 | Chiu | |

FOREIGN PATENT DOCUMENTS

| WO | WO 01/16691 A1 | 3/2001 |
|---|---|---|
| WO | WO 2004/084190 A2 | 9/2004 |

* cited by examiner

*Primary Examiner*—Tim T. Vo
*Assistant Examiner*—Jau-Shya Meng
(74) *Attorney, Agent, or Firm*—Leydig, Voit & Mayer, Ltd.

(57) ABSTRACT

A data retrieval apparatus includes a base unit, e.g., a geographic globe having a surface bearing a set of index information, and a pen-like operator separate from and co-operable wirelessly with the globe. The operator has a sensor for sensing the index information when it is brought close to the globe surface, a memory device for storing data information, associated with the index information, for retrieval, based on a reference to the index information sensed by the sensor, a controller for retrieving the data information from the memory device by reference to the index information sensed by the sensor, and a speaker for announcing the data information retrieved by the controller.

5 Claims, 7 Drawing Sheets

DATA RETRIEVAL APPARATUS

The present invention relates to data retrieval apparatus that is particularly, but not exclusively, for children.

BACKGROUND OF INVENTION

Data retrieval apparatus of the type concerned are known in general. Most of these apparatus comprise a globe and a pen connected by an electric cable to the globe for selecting a geographical location on the globe to cause a built-in speaker of the globe to play voice information relevant to the selected location.

The invention seeks to provide improved data retrieval apparatus.

SUMMARY OF THE INVENTION

According to the invention, there is provided data retrieval apparatus comprising:
- a base unit having a surface bearing a predetermined set of index information; and
- a handheld operator separate from and co-operable wirelessly with the base unit, the operator comprising:
- a sensor for sensing the index information when the sensor is brought close to the surface of the base unit;
- a memory device for storing data information associated with the index information for retrieval based on a reference to the index information sensed by the sensor;
- a controller for retrieving said data information from the memory device by reference to the index information sensed by the sensor; and
- a audio generator for announcing said data information retrieved by the controller.

Preferably, the base unit comprises a substantially spherical body whose outer surface comprises the said surface bearing the index information.

More preferably, the outer surface of the body comprises a map of the world, and the index information comprises geographical information representing various parts of the world.

It is preferred that the base unit includes a second surface bearing a predetermined set of type information representing a plurality of types of said data information, for sensing by the sensor of the operator as a second reference in conjunction with the first-mentioned reference for the controller to retrieve said data information.

It is preferred that the base unit includes a second surface bearing a predetermined set of type information representing a plurality of types of said data information, for sensing by the sensor of the operator as a second reference in conjunction with the first-mentioned reference for the controller to retrieve said data information.

It is further preferred that the base unit includes a bottom part for supporting the body, the bottom part including the second surface.

It is yet further preferred that the bottom part includes a third surface bearing a predetermined set of further index information in the form of a relatively more detailed map of a specific part of the world, for sensing by the sensor of the operator as an alternative reference to the first-mentioned reference for the controller to retrieve said data information.

It is yet further preferred that the second surface is an outer surface of the bottom part and the third surface is an inner surface of the bottom part that is revealable by said user as desired.

It is yet further preferred that the bottom part has a member including the third surface and movable to reveal the third surface.

In a preferred embodiment, the index information is printed on the or each said surface as codes.

More preferably, the codes comprise indiscernible dots on graphic or pictorial images.

In a preferred embodiment, the operator includes a casing holding the sensor, the memory device, the controller and the audio generator.

More preferably, the casing is elongate and has an end at which the sensor is located.

It is preferred that the operator includes connection means for connection to a personal computer, the connection means being in circuit with the memory device for updating content of the memory device with data obtained via said personal computer.

It is preferred that the operator includes a networking device for connection to the Internet, the networking device being in circuit with the memory device for updating content of the memory device with data obtained via the Internet.

It is further preferred that the networking device comprises a USB ISP bridge that enables USB connection of the operator to a personal computer connected to the Internet.

BRIEF DECRYPTION OF DRAWINGS

The invention will now be more particularly described, by way of example only, with reference to the accompanying drawings, in which.

DETAILED DESCRIPTION OF PREFERRED EMBODIMENT

Figure 1:
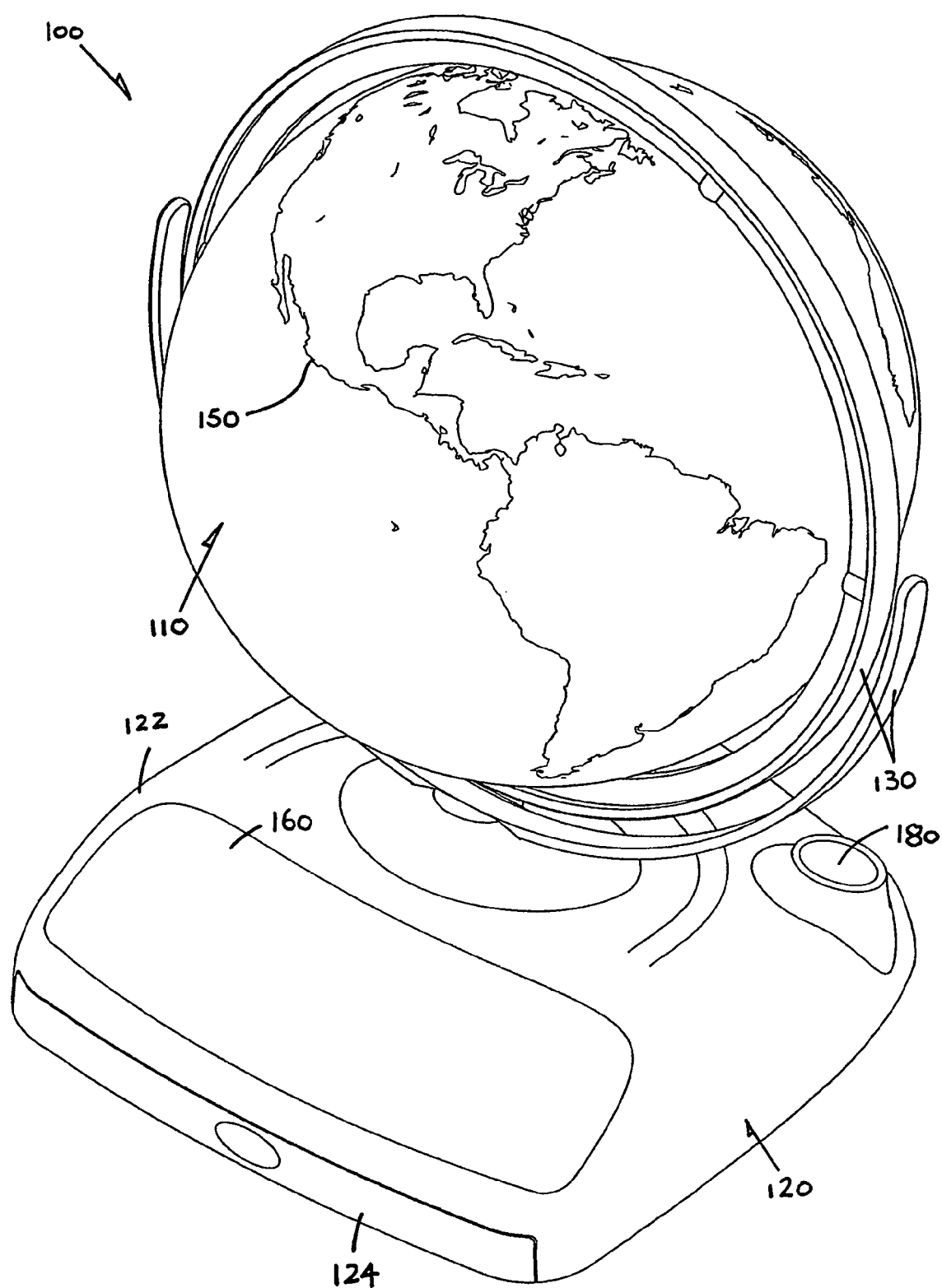
FIG. 1 is a front perspective view of a base unit of an embodiment of data retrieval apparatus in accordance with the invention.
Figure 2:
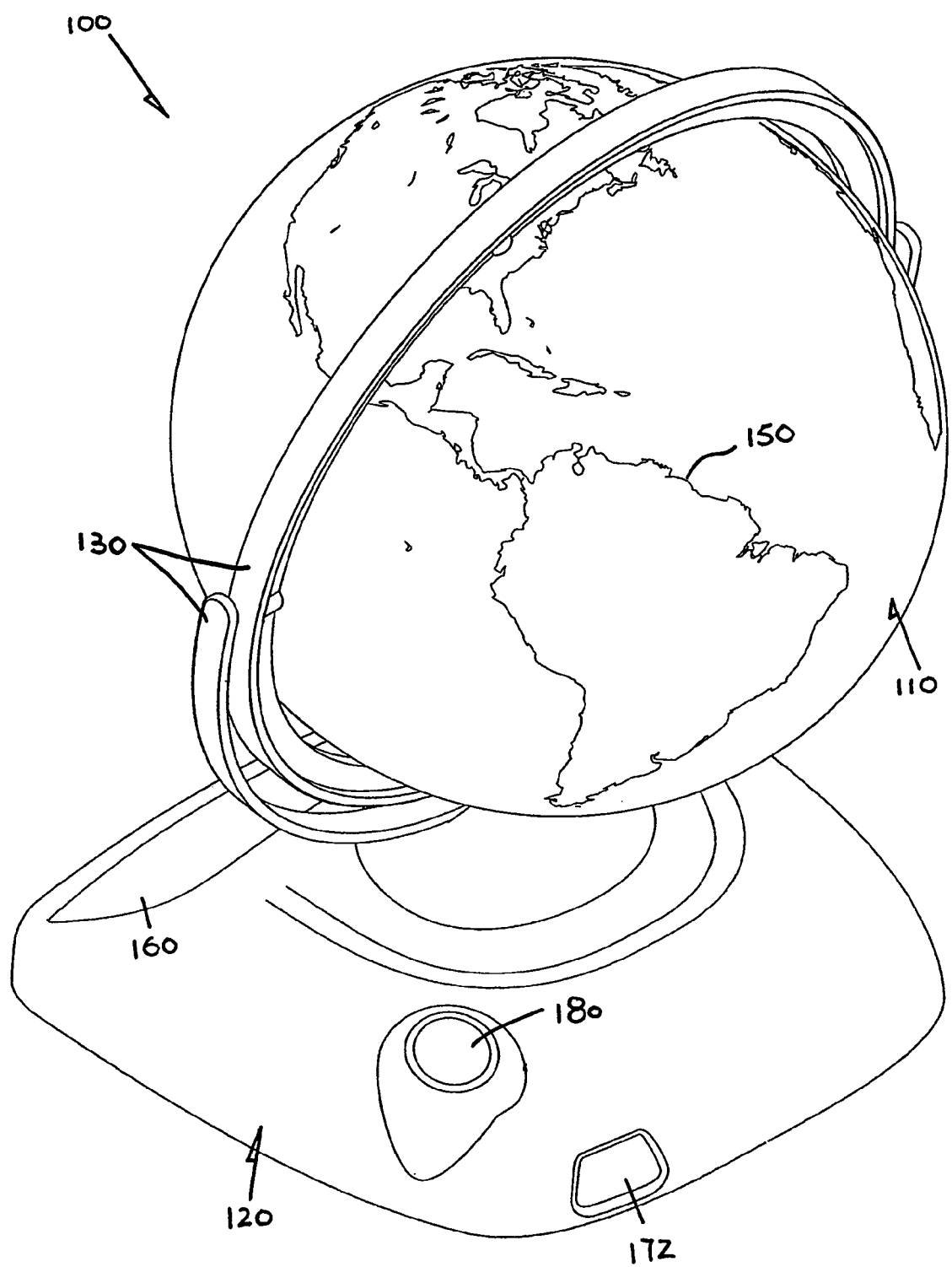
FIG. 2 is a rear perspective view of the base unit of FIG. 1.

Referring to the drawings, there is shown data retrieval apparatus embodying the invention, which comprise a base unit in the form of a geographic globe 100 and a handheld pen-shaped operator or a pen 200 in short that is wireless and separate from and is co-operable wirelessly with the globe 100. The globe 100 has a spherical body 110 whose outer surface bears a map of the world 150 which is encoded with a predetermined set of index information i.e. geographical information that represents the various parts of the world. The globe 100 includes a generally flat base 120 which supports the spherical body 110 for free 360° spinning in all directions on two, vertical and horizontal axes by means of a cross-pivot system 130 as is generally known in the art.

The world map 150 is printed on the globe body 110 employing a dot coding scheme using four colors which are red, blue and yellow for the various pictorial graphical features of the map 150 and include black as dots printed on the red, blue and yellow layers. The black dots are arranged in repeating patterns to form codes, i.e. the index information, which are readable by the pen 200 to identify the various locations i.e. continents, countries, capitals and cities, etc. for data retrieval. The layer of index dots has a tone that is tuned as light as possible to be indiscernible so as not to affect the original picture colors of the map 150.

Figure 3:
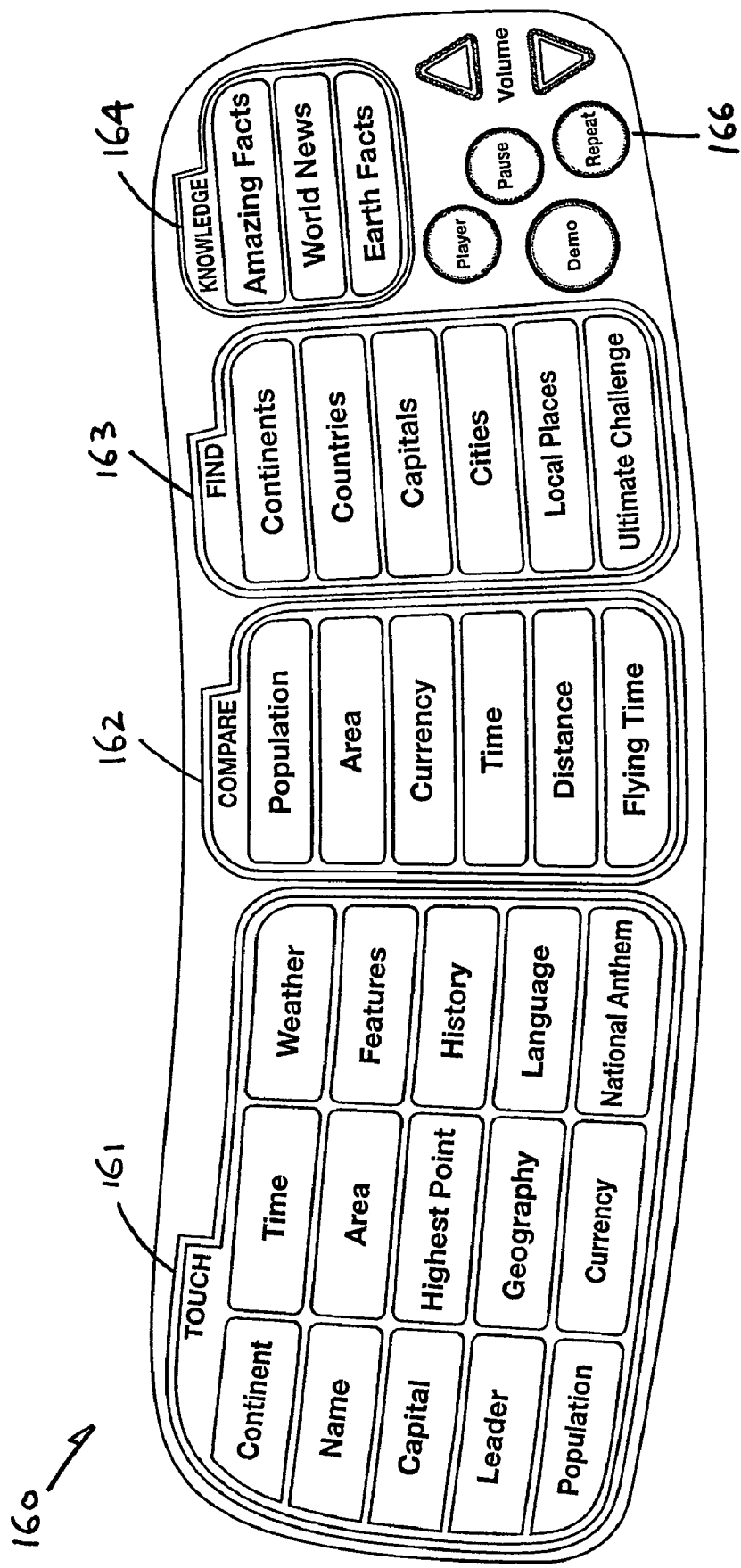
FIG. 3 is a top plan view showing an operation panel of the base unit of FIG. 1.
Figure 4:
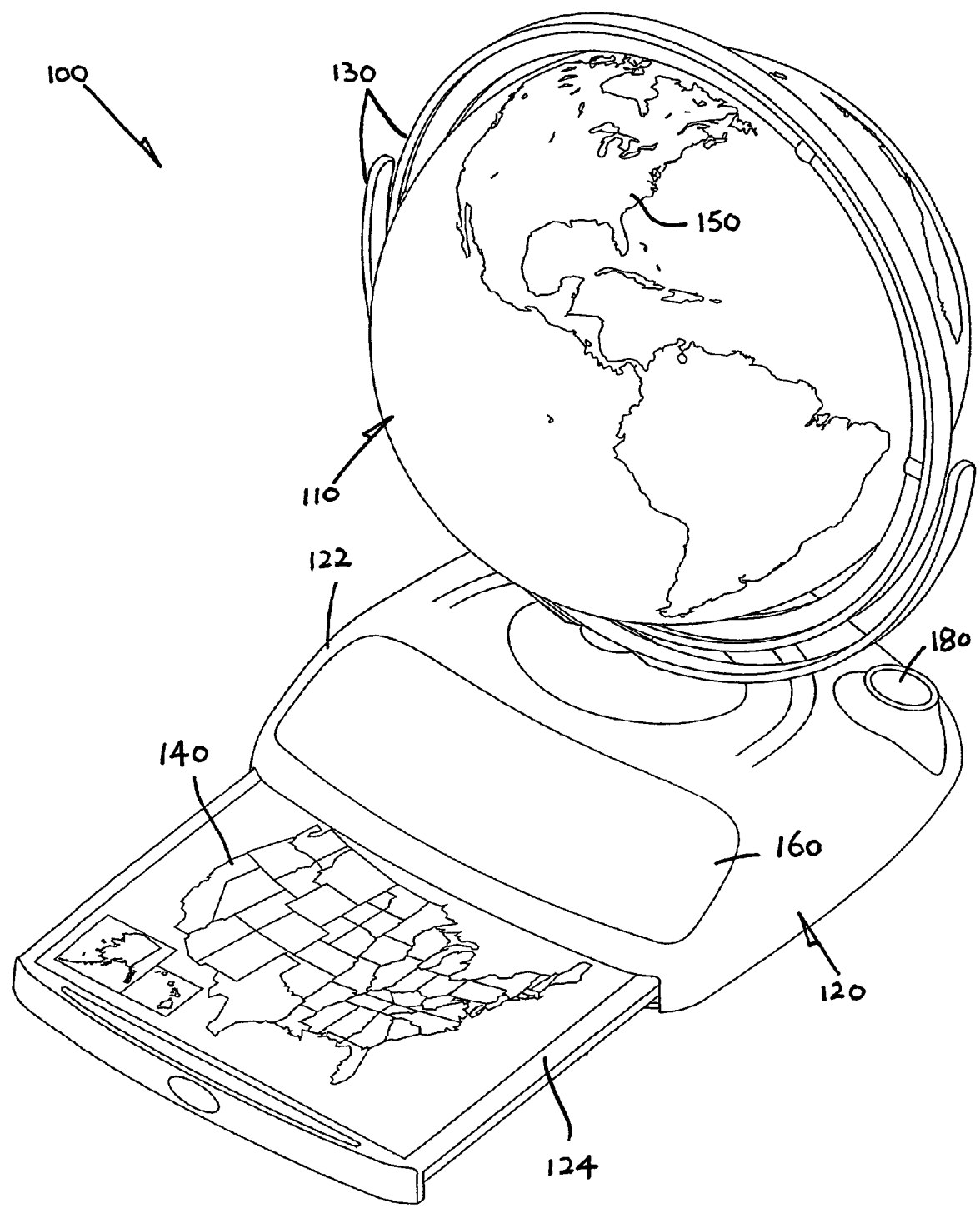
FIG. 4 is a front perspective view of the base unit of FIG. 1, with a local map thereof revealed.
Figure 5:
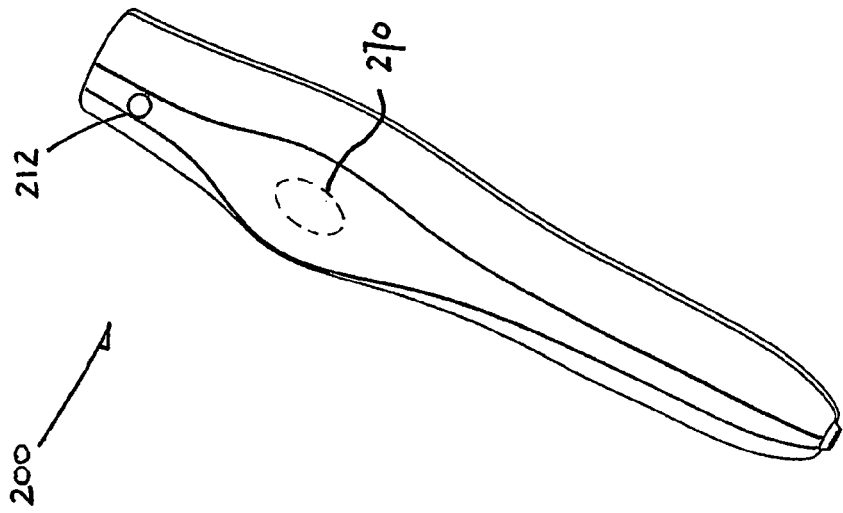
FIG. 5 is a front perspective view of an operator of the data retrieval apparatus for use with the base unit of FIG. 1.
Figure 6:
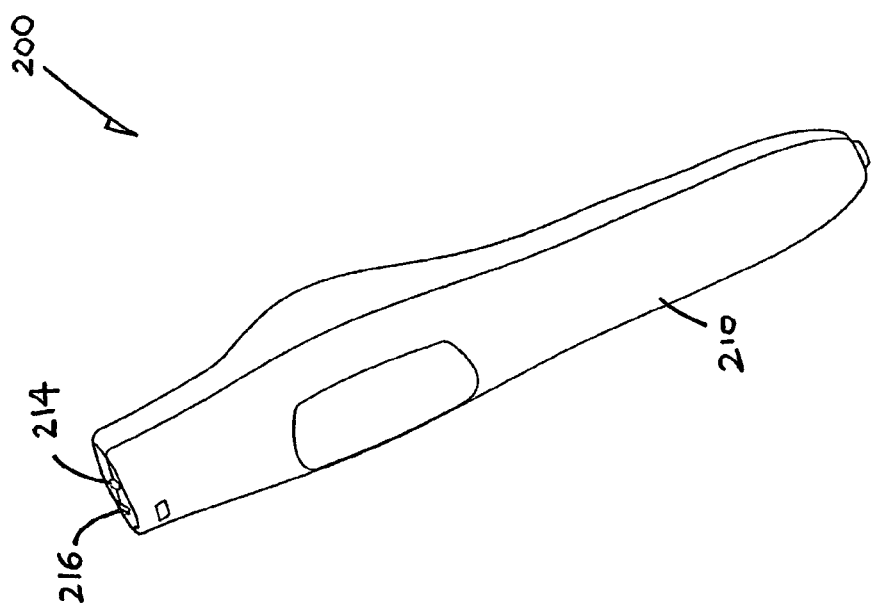
FIG. 6 is a rear perspective view of the operator of FIG. 5.

The globe base 120 has, on its front part, a sloping upper surface 122 which bears an operation panel 160. The panel 160 is provided by a label printed with a pattern of four groups of game/information activity buttons i.e. TOUCH, COMPARE, FIND and KNOWLEDGE buttons 161 to 164 and six control keys 166, using the same dot coding scheme as the world map 150 for reading by the pen 200 in the same manner. The activity buttons 161 to 164 are named according to the categories or types of data that the corresponding activities are to perform upon as shown in FIG. 3, and are encoded individually for user's selection to input the chosen activity commands with desired data types to the pen 200. Similarly, the control keys 166 are named as shown, and encoded, to indicate the control to implement at the pen 200, namely Player (for user's age group selection), Pause, Demo, Repeat and Volume up and down.

The globe base 120 includes a horizontal board 124 which is slidable into and out of the base's body like a draw.

The upper surface of the board 124 has a label stuck thereon, which is printed with a local map 140 using the same dot coding scheme as the world map 150 and operation panel 160 for reading by the pen 200 likewise in the same manner. The local map 140 is normally hidden but it may be revealed by pulling out the board 124.

Compared with the world map 150, the local map 140 shows more detailed geographical information about the country in which the subject data retrieval apparatus is marketed (and used), for example information about the member states for the United States of America. The local map 140 offers an alternative to the world map 150, providing a set of additional index information for data retrieval at the pen 200.

Figure 7:
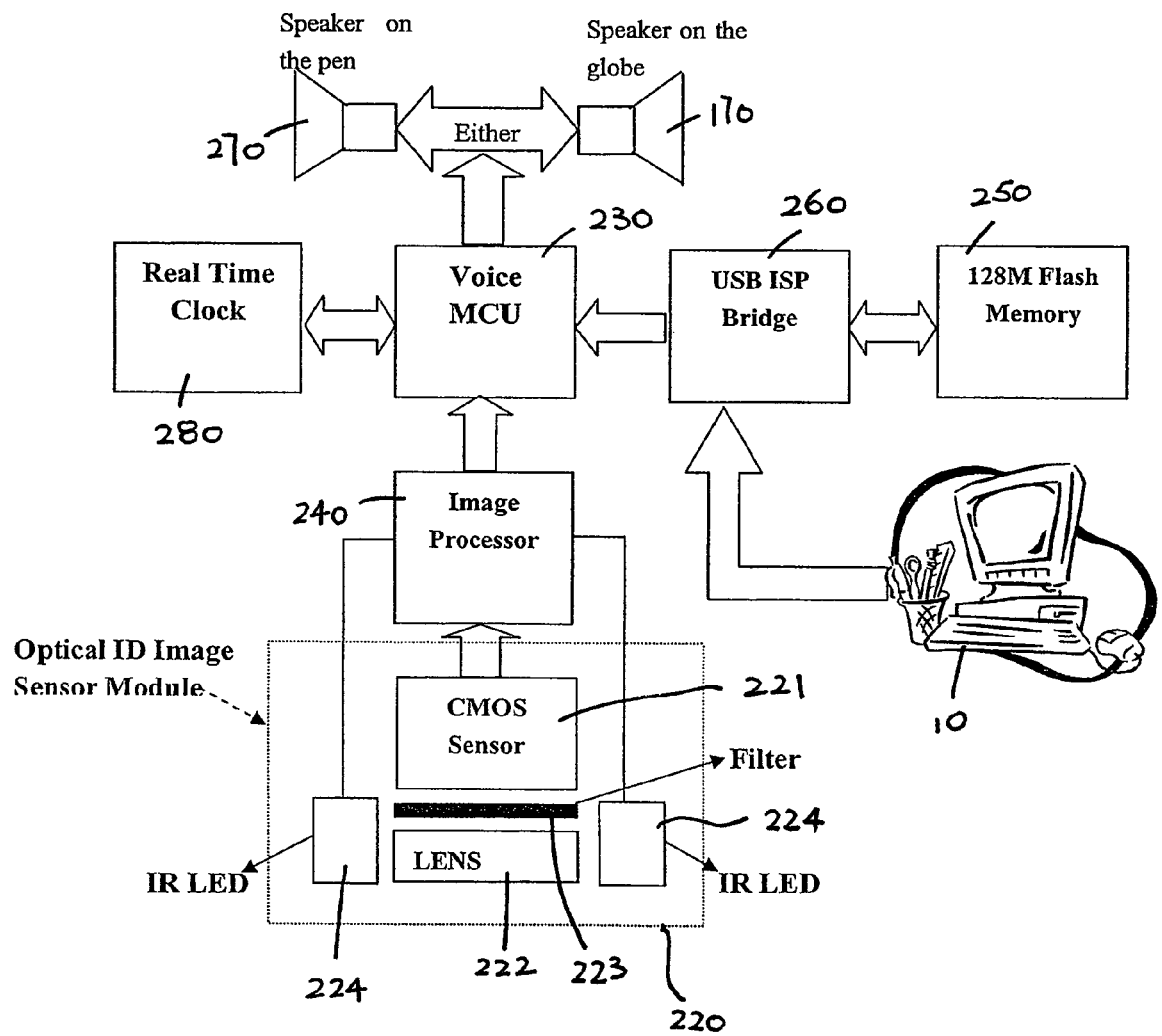
FIG. 7 is a schematic functional block diagram of the operating circuitry of the data retrieval apparatus.

The globe base 120 further includes an internal speaker 170 (see FIG. 7) and an associated speaker jack 172 at the back, as well as a cradle 180 for locating the pen 200 upright on the base 120.

The pen 200 has an elongate casing 210 for holding by a user and an optical ID image sensor module 220 located within the tip (i.e. lower end) of the casing 210 for image capturing. The sensor module 220 is formed by a CMOS sensor 221, a camera lens 222, a filter 223 between the sensor 221 and the lens 222, and a pair of IR LEDs 224 on opposite sides of the lens 222. The IR LEDs 224 are arranged to emit IR light at a surface bearing an image close to which the lens 222 is pointed at, with the IR light reflected from the surface detected by the sensor 221 through the lens 222 and filter 223, whereby the image is captured.

The pen 200 includes, as housed or supported within the casing 210, a voice MCU (microprocessor control unit) 230 for control and operation including voice processing, an image processor 240 for processing (e.g. decoding or recognizing) an image captured by the sensor module 220 and then feeding the same to the voice MCU 230, a 128 Mb flash memory 250 for storing data information and connected to the voice MCU 230 via a USB ISP bridge 260, and a speaker 270 connected to the voice MCU 230 for announcing the data information stored in the memory 250. The data information stored in the memory 250 is essentially voice data that comprises sound effects, human voices and music data, all preferably being stored as wave files. The flash memory 250 also serves to store the appropriate programs, codes and data, etc., such as system music and sounds, as required for the operation and functioning of the pen 200.

There is a real time clock 280 connected to the voice MCU 230, which keeps the real time for the system.

The USB ISP bridge 260 is an in-system programming chip for USB downloading of program to nor-flash memory. In the operating circuitry of the pen 200, the bridge 260 is connected as an interface in circuit with the voice MCU 230 and the flash memory 250 for the MCU 230 to receive data from the memory 250. More importantly, the bridge 260 also enables connection of the pen 200 using a USB cable to a user's PC (personal computer) 10 which is in turn connected to the Internet such that updated data information and programs, etc. can be downloaded, to update the content of the flash memory 250, via the PC 10 and the Internet from a remote server which runs an online website/platform to serve and provide supports to general users of the subject data retrieval apparatus. The time kept by the pen's clock 280 can also be synchronized by or via the PC 10, preferably automatically each time when the pen 200 is connected to the PC 10.

The pen 200 is battery-operated and includes a power on/off button 212 on the same side as the speaker 270 and an audio jack 214 and a USB socket 216 both at the upper end of the pen casing 210. The built-in speaker 270 is convenient to use but is power draining, and it will be disconnected upon insertion into the audio jack 214 of, for example, the plug of an earphone for private/quiet enjoyment. The USB socket 216 forms part of the USB ISP bridge 260 for USB connection.

In operation, the pen 200 is brought close to and pointed at a desired geographic location of the world map 150, or the local map 140, such that the sensor module 220 at the pen tip captures the index dots printed over that position and then outputs the associated 8-bit raw data through a 2-bit data bus from the CMOS sensor 221 to the image processor 240. In response, the image processor 240 decodes the raw data received from the sensor module 220 using a specific signal processing algorithm and then passes the decoded data to the voice MCU 230.

The user should also select the desired activity and data type by tapping the pen 200 at the relevant button 161/162/163/164 on the operation panel 160. In doing so, the pen's sensor module 220 captures the associated dot code and outputs the corresponding raw data to the image processor 240 and then the image processor 240 decodes the raw data and passes the decoded data to the voice MCU 230.

The aforesaid selections of geographic location and of activity and data type can be performed in the reversed order. At the completion of these two user's actions, the voice MCU 230 will recognize and act on the command and data received from the image processor 240 by executing the chosen activity function and retrieving the appropriate voice/sound/music data file from the flash memory 250 and finally announcing or playing the corresponding audio segment at the speaker 270.

As an alternative to the pen speaker 270, the speaker 170 of the globe 100 can be used by connecting an audio cable between the audio jack 214 of the pen 200 and the speaker jack 172 of the globe base 120. The globe speaker 170 will provide a better sound quality. Or, as mentioned above, an earphone can be used instead, connected to the pen's audio jack 214.

The operation of the subject data retrieval apparatus will now be described in further detail.

There are 30 activities, namely TOUCH (x15), COMPARE (x6), FIND (x6), World News (x1), Amazing Facts (x1) and Earth Facts (x1), all of which are selectable using the activity buttons 161 to 164. For a first time user, the default age group is "5-8". Upon tapping the Player key 166, the pen 200 will play "To change the number of player, press this button again" and then "Player+One, Two, Three, Four". Upon tapping the "Time" button 161 of the TOUCH activity, the pen 200 will play "Time hasn't been set yet. Please connect to your PC to download our latest information."

Each product of the subject data retrieval apparatus is accompanied by an installation CD for installation before use, including installing an associated operation program and relevant drivers, etc. on the PC 10 for use with the pen 200 and loading an initial set of data information (from the CD) into the pen's flash memory 250. A unique access code is assigned to the apparatus, as appearing on the CD cover. The user should initially enter the access code into the operation program and then follow the on-screen instructions to register and activate the code. In particular, the user will be asked to select his/her age group and to press a download button to start download.

Figure 8:
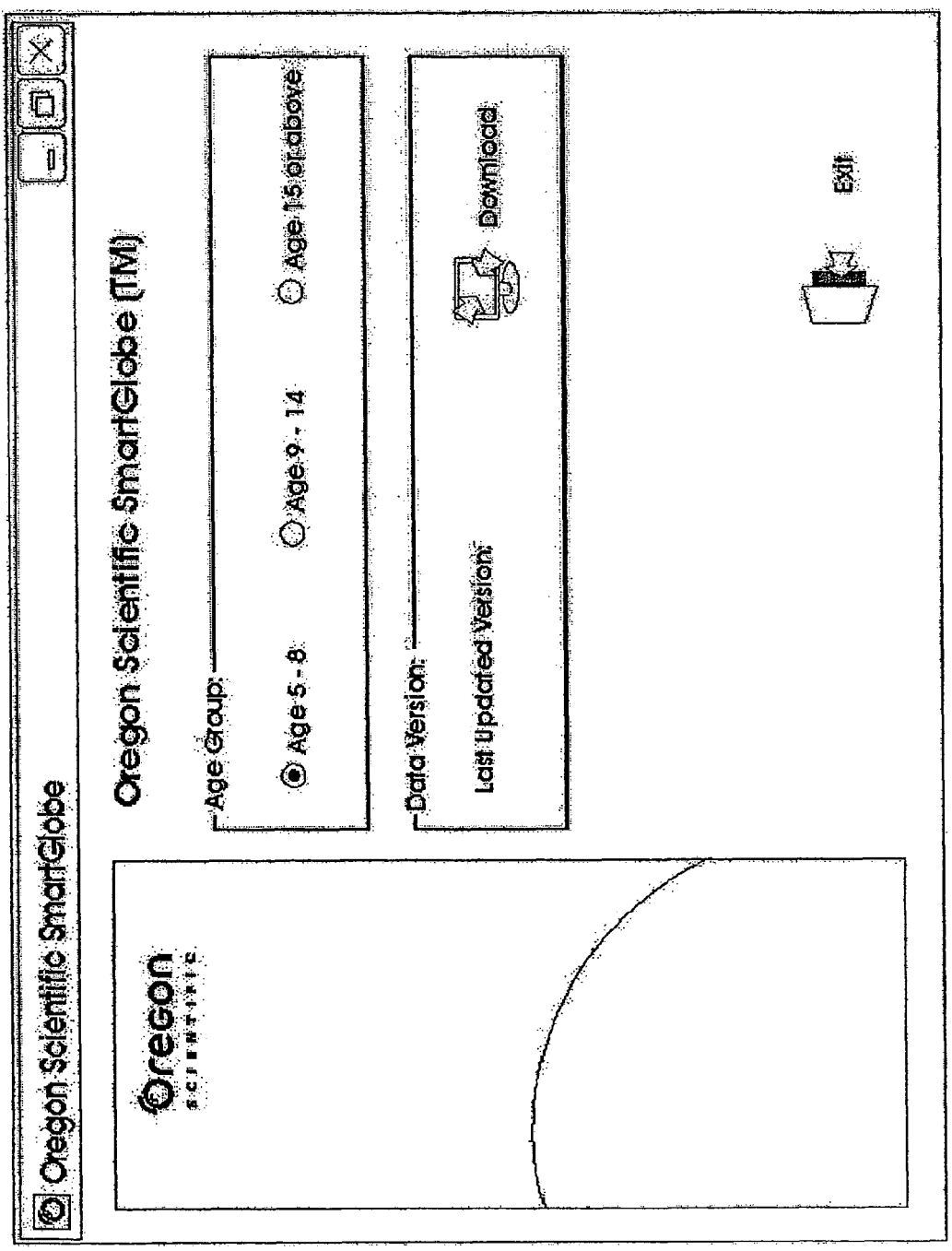
FIG. 8 is a screenshot showing a control panel of an operation program associated with the data retrieval apparatus.

In general, upon connection of the pen 200 to the PC 10 that is in turn connected to the Internet, the operation program automatically runs and pops up a data update screen (FIG. 8) on the PC 10 and automatically checks for update on the server by sending information to the server to verify the content version and data specification. The relevant age group for the player is shown or can be selected on screen. The update checking process is run behind the screen. In case there is update information, the PC 10 will prompt and instruct the user to start download. If update is not necessary, the pen 200 will play "No new data available".

There are 15 TOUCH activities. While awaiting player's instructions on this game, the pen 200 will play, as appropriate, "Pick an activity, then touch the Globe for more information", "To start your game, press any button to select an activity" and "Then, touch the Globe for more information".

To start the TOUCH game, the player should tap any one of the TOUCH buttons 161 on the globe base 120 and then select a location on the globe body 110. Taking New York as an example, the pen 200 will play the relevant voice segment as indicated in the following table, which shows the voice segments for all of the 15 data types or topics relative to different player age groups "5-8", "9-14" and "15+" (i.e. age 15 or above).

The topic can be changed at any time by tapping another activity button 161, or a different country can be picked by tapping a new location on the world map 150, whereupon the associated new piece of information is announced.

EXAMPLE 1

New York

| TOUCH items | Age 5-8 | Age 9-14 | Age 15+ |
| --- | --- | --- | --- |
| 1 Continent | | | |
| 2 Name | New York | New York (The Empire State) | Same |
| 3 Capital | Albany | Same | Same |
| 4 Leader | George Pataki | Same | Same |
| 5 Population | Over 19 million | Same | Same |
| 6 Time | (GMT-5) | Same | Same |
| 7 Area | New York is over half the size of the United Kingdom. | Same | Same |
| 8 Highest point | Mt. Marcy is the highest point in New York, it is over four times the height of the Empire State building. | Same | Same |
| 9 Geography | There are mountains in the northeast, where you can find Lake Ontario and Lake Erie. | | |
| 10 Currency | US Dollar | Same | Same |
| 11 Weather | New York has warm summers and cold winters. | TBC | TBC |
| 12 Features | New York is home to New York City, which is one of the biggest and most popular cities in the world. | TBC | TBC |
| 13 History | New York was one of the original Thirteen Colonies. The Dutch bought Manhattan from the Indians for some trinkets. | TBC | TBC |
| 14 Language | N/A | N/A | N/A |
| 15 National Anthem | The US national anthem | Same | Same |

EXAMPLE 2

Canada

| TOUCH items | Age 5-8 | Age 9-10 | Age 15+ |
|---|---|---|---|
| 1 Continent | North America | Same | Same |
| 2 Name | Canada | Same | Same |
| 3 Capital | Ottawa | Same | Same |
| 4 Leader | The prime minister of Canada is Paul Martin. | Same | Same |
| 5 Population | Over 32 million | Same | Same |
| 6 Time | (GMT - 08:00) | Same | Same |
| 7 Area | Canada + is very big. It's bigger than Australia. | Same | Same |
| 8 Highest point | Mount Logan is about two-thirds the size of Mount Everest, the tallest mountain on Earth. | Same | Same |
| 9 Geography | Canada is the world's second biggest country, next to Russia. In Canada you'll find large prairies with herds of cattle, golden fields of wheat, tall mountains with snowy tops, huge forests with very old trees, and beautiful fishing villages along the rocky Atlantic and Pacific Ocean coasts. | Located in North America, bordering the North Atlantic Ocean on the east, the North Pacific Ocean on the west, and the Arctic Ocean on the north. | Ottawa is located at around 45 27 North latitude and 75 42 West longitude, in the northern hemisphere. |
| 10 Currency | Canadian Dollar | Same | Same |
| 11 Weather | Canada reaches very far north, so the weather in many places is very cold and snowy all year round. But in southern Canada, near the U.S. border, the weather is more temperate, and changes with each of the four seasons. | The weather varies from temperate to sub-artic to artic. The average temperature of 24 degrees Fahrenheit. (Minus 4 degrees Celsius) | The average annual rainfall is 314 mm. With the average climate ranging from 16 to 31 degrees Fahrenheit. (Minus 8 to 0 degrees Celsius) |
| 12 Features | See the bighorn sheep in the snowy mountains and visit awesome Lake Louise up in the Rocky Mountains to see one of the most beautiful mountain lakes in the world! | The most recognizable icon in Canada is the CN Tower, along with Ontario maple syrup made from 100% pure maple sap, which is very famous. The sugar maple tree is unique to the southeastern part of Canada. | Canada's Royal Canadian Mounted Police, also called 'Mounties,' are a popular national symbol. The most important festival in Canada is the Maple Sugar Festival held in March. |
| 13 History | Canada + had many groups of native inhabitants before Europeans arrived, who lived, hunted and traded throughout the land. | The first inhabitants of Canada were native Indian peoples, primarily the Inuit. Their Independence day is on the 1st of July, 1867 | Eastern Canada was settled by both English and French colonists and was ceded to England in 1763 after the Seven Years' War. |
| 14 Language | The official language of Canada is English. Hello! | Same | Same |
| 15 National Anthem | The Canada national anthem | Same | Same |

There are 6 COMPARE activities. While awaiting player's action on this game, the pen 200 will play the voice instruction "To compare the population/Area/Currency/Time/Flying Time", "First location" and "Second location".

To start the COMPARE game, the player should tap any one of the COMPARE buttons 162 on the globe base 120, whereby the type of information to compare is determined, and then select two locations on the world map 150 (or the local map 140). During selection, the pen 200 will announce the name of the first location immediately upon tapping, then play "second point" to request a second location, and subsequently announce the name of second location immediately upon tapping.

Taking China/India, Japan/Italy and United States/Japan as examples, the following table lists the corresponding voice segments that the pen 200 will play in respect of all of the 6 data types to compare. Different player age groups "5-8", "9-14" and "15+" share the same voice segments.

| COMPARE items | Age 5-8 | Age 9-10 | Age 15+ |
|---|---|---|---|
| 16 Population | Population + China + about XXX that of India | " | " |
| 17 Area | Area + India + about + XXX that of + China | " | " |
| 18 Currency | Currency + China + about + XX + that of + India | " | " |
| 19 Time | Japan + about + 13 hours + earlier than + Italy OR "later than" OR "same as" | " | " |
| 20 Distance | United States + about + XXX + Miles + away from Japan. | " | " |
| 21 Flying Time | The flying time is + about + XXX hour + and + XXX min. | " | " |

There are 6 FIND activities, some having three rounds of increasing challenge levels, for up to four players. To start the game, any one of the FIND buttons 163 should be tapped, whereupon the pen 200 will ask a question as shown in the table below and then await an answer. A certain length of time will be given for the player to tap the right place on the globe body 110, namely 90 seconds for the age group "5-8", 60 seconds for the age group "9-14" and 45 seconds for the age group "15+".

In general, ten questions will be asked for each round, except the subject type "Continent" for which there will only be seven questions.

the last one has been played. All the age groups are given access to this activity but with different types of data.

To play the World News, the middle KNOWLEDGE button 164 should be pressed using the pen 200, and then the first/next news will be played. There are up to 10 facts, which will be updated monthly or bi-weekly.

To play the Earth Facts, the lower KNOWLEDGE button 164 should be pressed using the pen 200, and then the first/next news will be played. There are up to 20 facts, which will be updated monthly or bi-weekly.

In this particular embodiment, a globe (100) is employed as the base unit of the subject data retrieval apparatus such that

| TOUCH items | Age 5-8 | Age 9-10 | Age 15+ |
|---|---|---|---|
| 22 Continents | Look for 7 continents; No hints. | Look for 7 continents; No hints. | Look for 7 continents; No hints. |
| 23 Countries | Look for main countries in the world; 2 hints: a) Look in North/South hemisphere b) Look in (continent) | Look for larger countries in the world; 2 hints: a) Look in North/South hemisphere b) Look in (continent) | Look for countries in the world; 2 hints: a) Look in North/South hemisphere b) Look in (continent) |
| 24 Capitals | Look for main countries' capitals; 3 hints: a) Look in North/South hemisphere b) Look in (continent) c) Look in (country) | Look for larger countries' capitals; 3 hints: a) Look in North/South hemisphere b) Look in (continent) c) Look in (country) | Look for countries' capitals; 3 hints: a) Look in North/South hemisphere b) Look in (continent) c) Look in (country) |
| 25 Cities | Look for main cities; 3 hints: a) Look in North/South hemisphere b) Look in (continent) c) Look in (country) | Look for larger cities. 3 hints: a) Look in North/South hemisphere b) Look in (continent) c) Look in (country) | Look for larger cities. 3 hints: a) Look in North/South hemisphere b) Look in (continent) c) Look in (country) |
| 26 Local Cities | Look for big cities. 1 hint: Look in city between (cities) / Look in city next to (city) | Look for larger cities. 1 hint: Look in city between (cities) / Look in city next to (city) | Look for cities. 1 hint: Look in city between (cities) / Look in city next to (city) |
| 27 Ultimate Challenge | Mix the above find game | Same | Same |

To play the Amazing Facts, the upper KNOWLEDGE button 164 should be pressed using the pen 200, and then the first/next fact will be played. There are up to 20 facts, which will be updated monthly or bi-weekly. The button 164 is touched once for each new fact. The fact will not repeat until the users can have a feel of geographical locations and directions around the planet. It is envisaged that the base unit can take the form of a book or bound charts, such as a world atlas (akin to the local map 140) so that more encoded index information can be packed into a smaller size.

It should be noted that any other suitable coding schemes for the index information may be adopted, which do not require electrical wire/cable connection of the handheld operator to the base unit.

The subject matter of the data handled by the subject apparatus is unlimited. For example, the base unit can depict a zoo/jungle or animals around a globe, in that the animals are encoded with respective indexes for selective input to the handheld operator to prompt the operator to retrieve and play the relevant pre-recorded voice information relating to those animals, such as their names and habitat.

The pen 200 communicates with the PC 10 via USB connection. It is envisaged that the communication can be implemented using wireless connection technologies, such as the 2.4 GHz radio frequency protocol or the Bluetooth technology, in which case the bridge 260 is replaced by a suitable RF transceiver or Bluetooth module.

The invention has been given by way of example only, and various other modifications of and/or alterations to the described embodiment may be made by persons skilled in the art without departing from the scope of the invention as specified in the appended claims.

What is claimed is:

1. A data retrieval apparatus comprising:
    a base unit having a surface and a plurality of optically coded items of index information distributed on the surface; and
    a handheld operator separate from and cooperating, wirelessly, with the base unit, the handheld operator comprising:
        an optical sensor for optically sensing the optically coded items of index information when the sensor is brought close to the surface of the base unit,
        a memory device storing
            a plurality of items of voice data, each item of optically coded index information being associated with one of the items of the voice data, and
            programs, codes, and data required for operation of the handheld operator,
        a controller controlling the optical sensor and the memory device and retrieving from the memory device the voice data associated with the optically coded index information optically sensed by the optical sensor,
        an audio generator converting the voice data retrieved from the memory device under control of the controller into audio,
        a speaker for reproducing the audio, and
        connection means for connecting the handheld operator to a personal computer, the connection means, when in communication with the memory device, updating the data information and programs stored in the memory device with data obtained via the personal computer, wherein the base unit comprises
            a spherical body having an outer surface comprising a map of the world as the surface on which the plurality of optical coded items of index information are distributed and the plurality of optically coded items of index information comprise items of geographical information pertaining to respective locations on the map of the world,
            a second surface bearing a set of type information representing a plurality of types of the optically coded items of index information optically sensed by the optical sensor of the handheld operator, and
            a bottom part supporting the spherical body, the bottom part including the second surface and a third surface bearing further optically coded items of index information on a map relatively more detailed than the map of the world and showing a specific part of the world, the further optically coded items of index information being optically sensed by the optical sensor of the handheld operator and used in retrieval of the voice data from the memory device under control of the controller, wherein the second surface is an outer surface of the bottom part, the bottom part has a member including the third surface, and the member is movable so that the third surface, which is an inner surface of the bottom part, is revealed upon movement of the member by a user.

2. The data retrieval apparatus as claimed in claim 1, wherein the handheld operator includes a casing holding the optical sensor, the memory device, the controller, the audio generator, and the speaker.

3. The data retrieval apparatus as claimed in claim 2, wherein the casing is elongate and has an end at which the optical sensor is located.

4. A data retrieval apparatus comprising:
    a base unit having a surface and a plurality of optically coded items of index information distributed on the surface; and
    a handheld operator separate from and cooperating, wirelessly, with the base unit, the handheld operator comprising:
        an optical sensor for optically sensing the optically coded items of index information when the sensor is brought close to the surface of the base unit,
        a memory device storing
            a plurality of items of voice data, each item of optically coded index information being associated with one of the items of the voice data, and
            programs, codes, and data required for operation of the handheld operator,
        a controller controlling the optical sensor and the memory device and retrieving from the memory device the voice data associated with the optically coded index information optically sensed by the optical sensor,
        an audio generator converting the voice data retrieved from the memory device under control of the controller into audio,
        a speaker for reproducing the audio, and
        a networking device connectable to the Internet, the networking device, when in communication with the memory device, updating the data information and programs stored in the memory device with data obtained via the Internet, wherein the base unit comprises
            a spherical body having an outer surface comprising a map of the world as the surface on which the plurality of optical coded items of index information are distributed and the plurality of optically coded items of index information comprise items of geographical information pertaining to respective locations on the map of the world,
            a second surface bearing a set of type information representing a plurality of types of the optically coded items of index information optically sensed by the optical sensor of the handheld operator, and a bottom part supporting the spherical body, the bottom part including the second surface and a third surface bearing further optically coded items of index information on a map relatively more detailed than the map of the world and showing a specific part of the world, the further optically coded items of index information being optically sensed by the optical sensor of the handheld operator and used in retrieval of the voice data from the memory device under control of the controller, wherein the second surface is an outer surface of the bottom part, and the third surface is an inner surface of the bottom part.

5. The data retrieval apparatus as claimed in claim 4, wherein the networking device comprises a USB ISP bridge that enables USB connection of the handheld operator to a personal computer connected to the Internet.

* * * * *